United States Patent
Nakagaki et al.

(10) Patent No.: US 7,657,078 B2
(45) Date of Patent: Feb. 2, 2010

(54) METHOD AND APPARATUS FOR REVIEWING DEFECTS

(75) Inventors: Ryo Nakagaki, Kawasaki (JP); Toshifumi Honda, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 648 days.

(21) Appl. No.: 11/311,254

(22) Filed: Dec. 20, 2005

(65) Prior Publication Data

US 2006/0215901 A1 Sep. 28, 2006

(30) Foreign Application Priority Data

Mar. 22, 2005 (JP) ............... 2005-081507

(51) Int. Cl.
*G06K 9/00* (2006.01)

(52) U.S. Cl. ............... 382/148; 356/237.4; 356/237.5; 382/149; 382/218

(58) Field of Classification Search ............... 250/201.3; 356/72, 237.2, 237.5; 382/141, 145, 148, 382/149

See application file for complete search history.

(56) References Cited

U.S. PATENT DOCUMENTS

| | | | |
|---|---|---|---|
| 6,407,373 B1 * | 6/2002 | Dotan | 250/201.3 |
| 6,483,938 B1 * | 11/2002 | Hennessey et al. | 382/149 |
| 6,605,478 B2 * | 8/2003 | Pnueli et al. | 438/14 |
| 7,103,505 B2 * | 9/2006 | Teshima et al. | 702/183 |
| 7,127,099 B2 * | 10/2006 | Noy | 382/149 |
| 7,242,467 B2 * | 7/2007 | Wienecke | 356/237.5 |
| 7,440,606 B2 * | 10/2008 | Sanda | 382/141 |
| 7,526,119 B2 * | 4/2009 | Isomura et al. | 382/148 |
| 2001/0042705 A1 * | 11/2001 | Nakagaki et al. | 209/44.4 |
| 2002/0113234 A1 * | 8/2002 | Okuda et al. | 257/48 |
| 2003/0050761 A1 * | 3/2003 | Okabe et al. | 702/82 |
| 2005/0226494 A1 * | 10/2005 | Yamamoto et al. | 382/149 |
| 2006/0082763 A1 * | 4/2006 | Teh et al. | 356/72 |
| 2009/0123060 A1 * | 5/2009 | Liu et al. | 382/149 |

FOREIGN PATENT DOCUMENTS

| | | |
|---|---|---|
| JP | 2001-331784 | 11/2001 |
| JP | 2003-98114 | 4/2003 |

* cited by examiner

*Primary Examiner*—Gregory M Desire
(74) *Attorney, Agent, or Firm*—Antonelli, Terry, Stout & Kraus, LLP.

(57) ABSTRACT

An apparatus for reviewing defects including an image processing section (defect classification device section) with a function of estimating a non-defective state (reference image) of a portion in which the defect exists by use of a defect image, and a function of judging criticality or non-flat state of the defect by use of the estimation result. It becomes possible to establish both of a high-throughput image collecting sequence in which any reference image is not acquired and high-precision defect classification, and then to realize both of a high performance classifying function and a high-throughput image collecting function in a defect reviewing apparatus which automatically collects and classifies images of defects existing on a sample of a semiconductor wafer or the like.

22 Claims, 13 Drawing Sheets

DEFECT IMAGE

NON-DEFECTIVE PATTERN
ESTIMATION RESULT

DEFECT IMAGE

SYNTHESIZED REFERENCE IMAGE

BINARIZED RESULT OF DIFFERENCE IMAGE

SYNTHESIZED REFERENCE IMAGE

WIRING RECOGNITION RESULT IMAGE

METHOD AND APPARATUS FOR REVIEWING DEFECTS

INCORPORATION BY REFERENCE

The present application claims priority from Japanese application JP 2005-081507 filed on Mar. 22, 2005, the content of which is hereby incorporated by reference into this application.

BACKGROUND OF THE INVENTION

1. Field of the Invention

The present invention relates to a defect reviewing apparatus for reviewing various types of defects generated in a process of manufacturing a semiconductor wafer, a liquid crystal panel or the like to classify the defects, more particularly to a defect reviewing apparatus having a function of automatically collecting images of defective portions at a high speed and a function of automatically classifying the images with a good precision, and a defect reviewing method using a defect reviewing apparatus.

2. Description of the Related Art

There has increasingly advanced miniaturization of a circuit pattern formed in a semiconductor wafer. The advancement of the miniaturization of the circuit pattern increases influences, on a product yield, of defects generated in a process of manufacturing the wafer, and it is increasingly important to manage a manufacturing stage so as to prevent such defects from being generated. At present, in a site where the semiconductor wafer is manufactured, in general, a yield countermeasure has been taken by use of a wafer inspection device and an observation device. The inspection device checks a portion on the wafer where the defect exists at a high speed. A state of the wafer surface is formed into an image by use of optical means or an electron beam, and the image is automatically processed to check the presence of the defect. In the inspection device, since the high speed is important, a pixel size of an image to be acquired is set to be as large as possible (i.e., resolution is lowered) to thereby reduce an image data amount. In many cases, there is a problem that although the presence of the defect can be confirmed from the detected image having a low resolution, it is not possible to distinguish a defect type.

On the other hand, a defect reviewing apparatus is an apparatus for use in picking up an image of each defect detected by the inspection device in a state in which the pixel size is reduced (i.e., the resolution is high) to classify the defects. At present, the defect reviewing apparatus has been brought from each maker to the market. The apparatus automatically performs image pickup processing or classification processing manually or by means of a computer. The image resolution required for classifying the defects with a sufficiently high precision is determined by the defect which is a processing object in the defect reviewing apparatus. In a semiconductor manufacturing process in which the miniaturization increasingly advances, the defect size reaches the order of several tens of nanometers. For this or another reason, the defect reviewing apparatus starts to be used in which a scanning electron microscope capable of reducing the pixel size to several nanometers is used.

In Japanese JP-A-2001-331784, there are disclosed outlines of device constitution and function of a scanning electron microscope (hereinafter referred to as the review SEM) for reviewing the defects, for use in a semiconductor production site. In the publication, an automatic defect classification (hereinafter referred to as the ADC) technology is described in which coordinate data of each defect obtained from the wafer inspection device and the wafer are supplied to the review SEM to thereby automatically acquire (automatic defect review: hereinafter referred to as ADR) an image (hereinafter referred to as the defect image) including each defect in a field of view and an image (reference image) of a non-defective pattern that does not include any defect in the same view field as that of the defect image (hereinafter referred to as automatic defect review: ADC), and the defects are classified by use of these images.

Moreover, as to a throughput increasing technology of this ADR, in JP-A-2003-98114, there is described a technology to estimate a defect position from the field of view by use of periodicity information of a defect background circuit pattern estimated from the defect image. This technology is suitable for a case where the defect exists in a pattern (e.g., a memory cell pattern of a semiconductor memory) in which the same circuit structure is periodically disposed in the field of view. Furthermore, since the ADR can be executed without acquiring any reference image, a processing time (i.e., image acquiring time) of the ADR can be largely reduced.

Additionally, as one of the most important technical problems in the review SEM, there increases the throughput of the ADR in which the defect position is automatically extracted from the field of view of the defect image. In the ADR processing performed in the review SEM, the image needs to be picked up at low and high magnifications, when the image of one defect is acquired. Usually, two types of images are picked up: the defect image; and the reference image, various types of overheads (e.g., automatic focusing before the acquisition of the image, stage movement for moving the field of view of the microscope from an image pickup position of the defect image to that of the reference image, etc.) accompanying the image pickup are large, and a time of about four seconds is required for each defect. Therefore, it is important to reduce an overhead time such as an image pickup time and reduce the time per defect in order to enhance an operation rate of the review apparatus.

However, in the ADR processing in which any reference image is not used as described in JP-A-2003-98114, the high throughput of the processing can be realized, but it is not considered that subsequently performed classification processing of the defect images be performed at a high degree of certainty.

In consequence, in either of JP-A-2001-331784 and JP-A-2003-98114, any consideration is not given to the technology of the ADC processing in a high-throughput ADR sequence or to the ADR and ADC processing to handle various circuit patterns formed in the semiconductor wafer.

SUMMARY OF THE INVENTION

According to the present invention, there are provided a defect reviewing apparatus (review SEM) to realize high-throughput and high precision ADR and ADC processing with respect to defects generated in a semiconductor wafer or the like which are objects, and a defect reviewing method in which the defect reviewing apparatus is used.

That is, according to the present invention, there is provided a defect reviewing method using a defect reviewing apparatus provided with image acquiring means for picking up an image of each defect of a sample to acquire the defect image. The method has an image processing step including: a non-defective state estimation calculating step of determining an estimation method of estimating a non-defective state of a defective portion in which each defect exists by use of at least the defect image acquired by the image acquiring means to calculate a non-defective state estimation result of the defective portion by use of the determined estimation method; and a defect classifying step of classifying each defect by use of the non-defective state estimation result of the defective portion calculated in the non-defective state estimation calculating step.

Moreover, according to the present invention, there is provided a defect reviewing method using a defect reviewing apparatus provided with image acquiring means for picking up an image of each defect of a sample to acquire the defect image. The method has an image processing step including: a non-defective state estimation calculating step of determining an estimation method of estimating a non-defective state of a defective portion in which each defect exists depending on whether or not a low-magnification reference image needs to be acquired to calculate a non-defective state estimation result of the defective portion by use of the determined estimation method; and a defect classifying step of classifying each defect by use of the non-defective state estimation result of the defective portion calculated in the non-defective state estimation calculating step.

Moreover, in the present invention, in the non-defective state estimation calculating step, the determined estimation method includes any of: a first method of estimating the non-defective state by use of a high-magnification defect image among the defect images; a second method of estimating the non-defective state in a low-magnification field of view of each defect by use of a low-magnification defect image among the defect images, and enlarging the estimated non-defective state in the low-magnification field of view to that in a high-magnification field of view; and a third method of estimating the non-defective state by use of the low-magnification and high-magnification defect images among the defect images and a low-magnification reference image acquired by picking up an image of a portion indicating the non-defective state by the image acquiring means.

Furthermore, in the present invention, the defect classifying step includes either or both of: a first judging step of judging a positional relation between the defect and a circuit pattern present in a background of the defect; and a second judging step of judging a non-flat state of the defective portion.

In addition, according to the present invention, the defect reviewing method using the defect reviewing apparatus further comprises a step of storing or displaying the non-defective state estimation result of the defective portion calculated in the non-defective state estimation calculating step.

Moreover, in the present invention, the defect reviewing apparatus is constituted of an electron microscope.

Furthermore, in the present invention, the defect reviewing apparatus has a function of changing the estimation method of estimating the non-defective state of the portion in which the defect exists and the classifying method of classifying the defects for each defect to be reviewed.

Additionally, according to the present invention, there is provided a defect reviewing apparatus having a function of switching a non-defective state estimation method and the defect classifying method for each defect depending on whether or not a low-magnification reference image needs to be acquired by means of automatic judgment processing using: a position coordinate (information indicating that each defect exists in either of repeated and unrepeated area) of the defect on a sample obtained from an inspection device; inspection conditions (conditions that each defect has been inspected in either of repeated and unrepeated modes) of an inspection device which has inspected each defect; or image information (image information indicating that each defect exists in either of the repeated and unrepeated areas) on the acquired defect.

According to the present invention, it is possible to realize high-throughput and high-precision ADR and ADC processing in the defect reviewing apparatus whose objects are defects generated in a semiconductor wafer or the like.

These and other objects, features, and advantages of the invention will be apparent from the following more particular description of preferred embodiments of the invention, as illustrated in the accompanying drawings.

DESCRIPTION OF THE EMBODIMENTS

There will be described embodiments of a defect reviewing apparatus (review SEM) using a scanning electron microscope according to the present invention and ADR and ADC processing using the apparatus with respect to defects in a semiconductor wafer.

Figure 1:
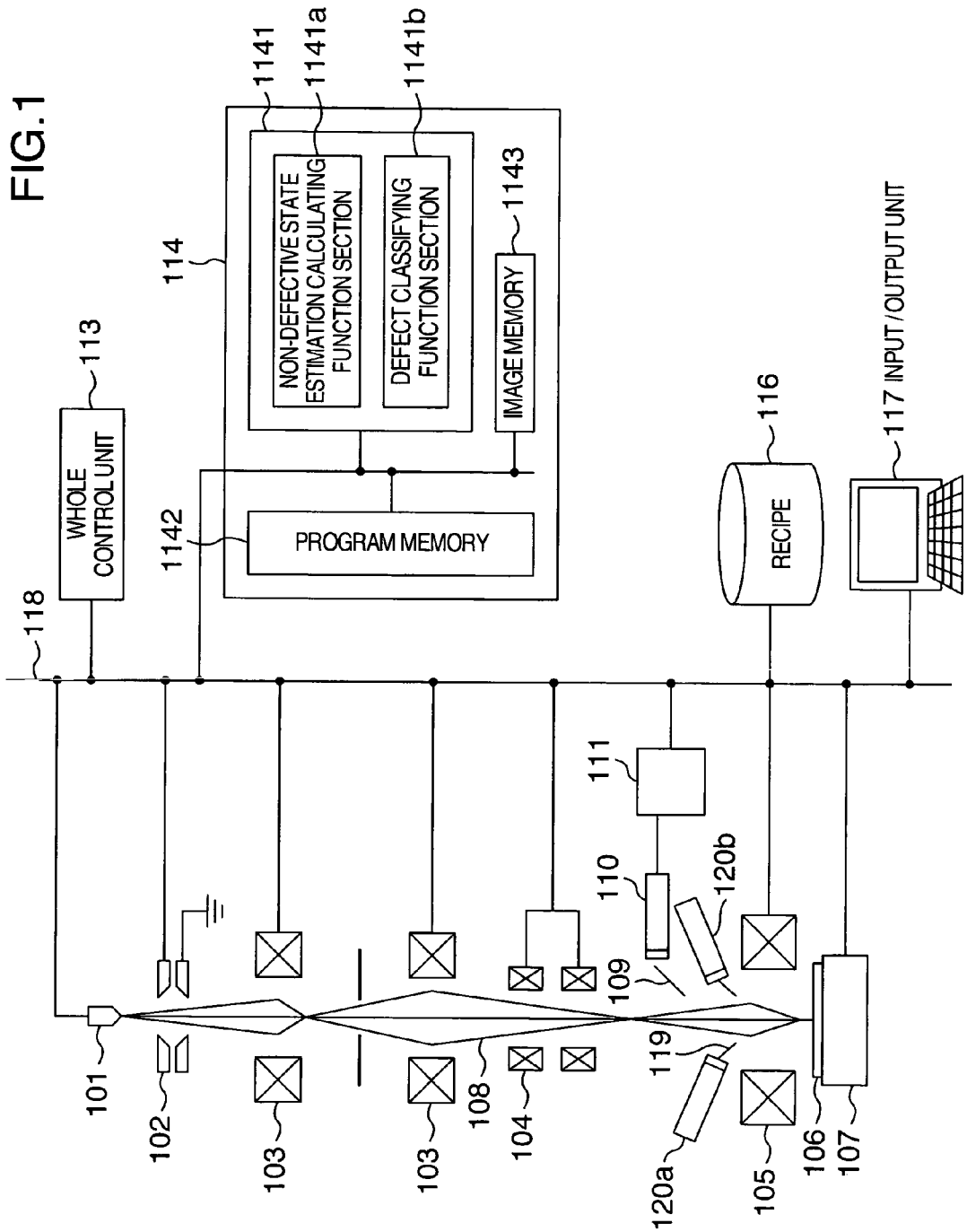
FIG. 1 is a constitution diagram showing one embodiment of a defect reviewing apparatus (review SEM)

First, there will be described one embodiment of the defect reviewing apparatus (review SEM) according to the present invention. FIG. 1 shows an outline of the defect reviewing apparatus (review SEM) according to the present invention. The electron microscope (SEM) is provided with: an electron source 101 which generates a primary electron 108; an accelerating electrode 102 for accelerating the primary electron; converging lenses 103 for converging the primary electron; a deflector 104 which two-dimensionally scans and deflects the primary electron; and an objective lens 105 for converging the primary electron onto a sample 106. Reference numeral 107 denotes a stage on which the sample 106 is mounted. Reference numeral 110 denotes a detector which detects a secondary electron signal 109 generated from the sample 106, and 120a, 120b denote reflected electron detectors which detect reflected electron signals 119, respectively. In FIG. 1, two reflected electron detectors 120a, 120b are disposed facing each other to detect different components of the reflected electron signals discharged from the sample 106. Reference numeral 111 denotes digitizing means for digitizing the detected signal. Each of these components is connected to a whole control unit 113 via a bus 118.

Additionally, in the present defect reviewing apparatus, there are connected to one another via the bus 118: an image processing unit (defect classifying device section) 114 which subjects the acquired image to ADR/ADC processing; a recipe unit 116 which stores a recipe containing inspection conditions and the like; and an input/output unit 117 constituted of devices such as a keyboard and a mouse for giving inspections to the apparatus, and a monitor and a printer for outputting data from the apparatus. It is to be noted that the image processing unit 114 is specifically constituted of: a CPU 1141 which performs the ADR/ADC processing in accordance with processing sequences shown in FIG. 2, 3, 5, or 6 based on acquired low-magnification and high-magnification defect images; a program memory 1142 which stores program to perform the ADR/ADC processing; and an image memory 1143 which stores image data such as image data acquired from the digitizing means 111.

Embodiment 1

Figure 2:
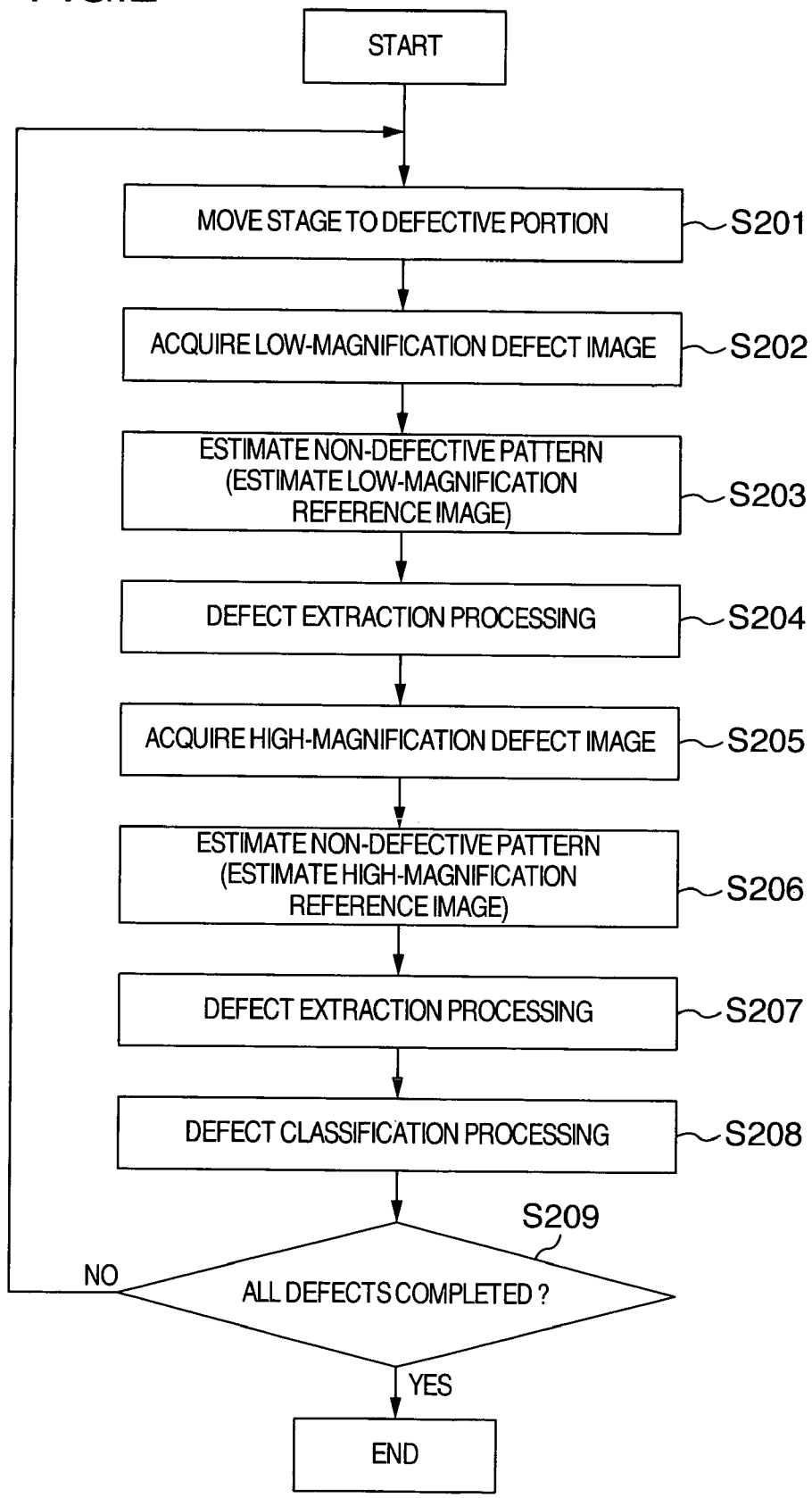
FIG. 2 is a processing flowchart showing a first embodiment of ADR and ADC processing by use of the defect reviewing apparatus.

Next, there will be described a first embodiment of ADR and ADC processing using a defect reviewing apparatus of the present invention. The first embodiment relates to a case where a circuit pattern of a background whose image is picked up as a defective SEM image is a repeated pattern of memory cells or the like, and a sequence is realized in which a reference SEM image is not picked up. The processing contents are shown in FIG. 2.

First, before starting the processing, the sample wafer 106 is disposed on the stage 107. Furthermore, position information of defects obtained by inspecting the sample wafer by means of an inspection device (not shown), and conditions such as various types of electronic optical system conditions (e.g., acceleration voltage, probe current, image pickup magnification) in picking up the image are stored in a recipe file, and the file is stored in the recipe unit 116. In this case, two types: a low magnification (e.g., about 10,000 times); and a high magnification (e.g., about 50,000 times) are set to the recipe. To classify very small defects, image information is required for analyzing a micro structure which is a processing object. Therefore, an image pickup magnification needs to be set to about 50,000 times or more, but a field of image pickup view is narrowed on such conditions. In a case where precision of agreement between a position coordinate of the defect detected by the inspection device and that of the defect reviewing apparatus (review SEM) is bad, it is presumed that an image pickup portion does not enter the field of view. In this case, in image acquisition processing, that is, ADR processing, two steps of processing are performed: (1) a step of acquiring an image having a broad field of view at a low magnification to extract a defect position from the image view field; and (2) a step of picking up an image of an extracted defect position at a high magnification.

An operator displays a recipe for use in measurement from a plurality of recipes registered in the recipe unit 116 in, for example, a monitor of the input/output unit 117 via the input/output unit 117 to instruct selection, and instructs the whole control unit 113 to perform the ADR/ADC on stored processing conditions. If necessary, the operator transmits, to the whole control unit 113, partial defect data to perform the ADR/ADC, selected from defect data which are results of the inspection device stored in the recipe 116. The whole control unit 113 processes defects as ADR/ADC objects one by one. After moving the stage 107 so that the object defect on the sample wafer 106 enters the image pickup view field (S201), image data of the portion, that is, a low-magnification defect image is acquired (S202).

In the image acquisition processing, after the primary electron 108 discharged from the electron source 101 is accelerated by the accelerating electrode 102, the electron is converged on the converging lens 103, and thereafter converged on the objective lens 105 to irradiate a measurement portion of the sample 106. In this case, the deflector 104 deflects a primary electron beam so as to two-dimensionally scan a region of the field of view determined by the magnification registered in the recipe by means of the primary electron.

The secondary electron 109 or the reflected electron signal 119 generated from the sample surface with which the electron beam has been irradiated is captured by the secondary electron detector 110 or the reflected electron detector 120, and converted into an optical signal by a scintillator (not shown). Thereafter, after converting the signal into an electric signal by a photomultiplier (not shown), the signal is converted into a digital signal by the digitizing means 111. The resultant digital signal is stored as a digital image in an image memory 115. It is to be noted that in the scanning electron microscope, there are many shot noises of the secondary electron generated from the sample. Therefore, when the same portion is scanned only once, an image having a sufficiently high S/N ratio cannot be obtained in many cases. Therefore, a primary electron beam is usually scanned as many times as scanning times (frame number) designated in the recipe to acquire digital data. Thereafter, an average image is obtained to thereby generate image data.

When the generated low-magnification image data is stored in the image memory 1143, in response to the instruction from the whole control unit 113, the CPU 1141 in the image processing unit 114 performs non-defective pattern estimation processing (S203) with respect to the low-magnification image in accordance with a non-defective pattern estimation program stored in the program memory 1142, and defect extraction processing with respect to the low-magnification image in accordance with a defect extraction processing program stored in the program memory 1142.

Figure 4A:
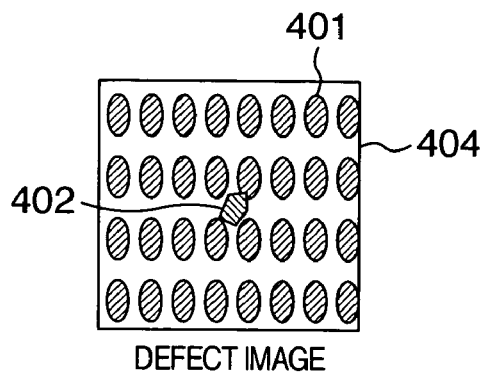
FIG. 4A is a diagram showing a low-magnification defect image.
Figure 4B:
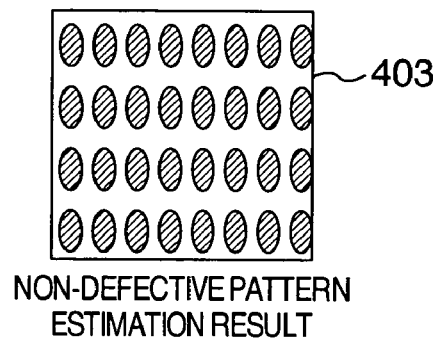
FIG. 4B is a diagram showing an image as an estimation result of a non-defective pattern of a low-magnification reference image.

First, here, there will be described a method in which the CPU 1141 detects a position of the defect in an image view field, and estimates a reference image shown in FIG. 4B, that is, a non-defective pattern image 403 where any defect does not exist, when a defect 402 exists on the pattern in a case where the circuit pattern of the background picked up as a defect image 404 is a repeated pattern of memory cells 401 and the like as shown in FIG. 4A. This method includes two steps of calculating a period of the repeated pattern 401 based on the defect image 404 acquired in the image memory 1143, and synthesizing the reference image 403.

Figure 4C:
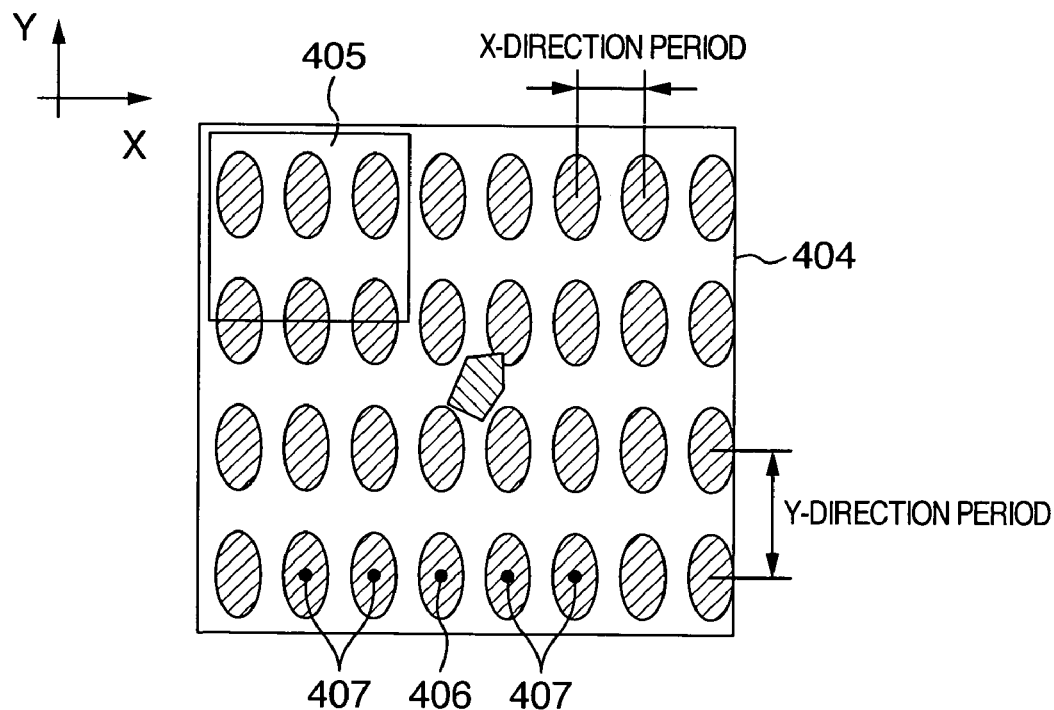
FIG. 4C is a diagram showing a method of obtaining a period of a pattern to prepare a repeated reference image from the defect image.

In a method of calculating the period, first as shown in FIG. 4C, an upper left rectangular area of an image is regarded as a template 405, the whole defect image 404 is regarded as an object image, and a mutual correlation function between two images is obtained. Moreover, a peak value is selected to obtain pattern periods in X and Y-directions and a representative period direction. In the repeated pattern shown in FIG. 4, integer times the period might be calculated as the period. Therefore, when there are a plurality of candidates (i.e., X, Y-periods whose correlation coefficient value is close to 1), the minimum candidate is selected. A direction in which the period is intense, specifically the correlation coefficient is large is selected as a representative direction from the X and Y-directions. It is to be noted that in a case where a defect is accidentally included in the selected template 405, when there is a possibility that the period is not exactly obtained, period calculation can be stabilized by setting a plurality of (four) templates 405 including upper right, lower right, and lower left templates, and selecting an intermediate value from period values obtained from the templates, respectively.

Next, as to each pixel, a gradation value of a self pixel 406 and gradation values of a plurality of pixels 407 are selected. The pixels 407 are distant as much as the obtained periods from the self pixel 406 in the obtained representative period direction. An intermediate value of an image (gradation value) of the plurality of pixels 407 is selected as the gradation value of the self pixel 406. Accordingly, the image in which any defect does not exist as shown in FIG. 4B, that is, the reference image 403 is synthesized, and can be stored in the image memory 1143. Even in a case where the pixel distant as much as the period deviates from the field of view, assuming continuity of the image, that is, assuming that the defect image 404 is infinitely repeated, the pixel value can be obtained. In this processing, it is assumed that the plurality of selected pixels 407 distant as much as the period from the area where any defect does not exist in the representative period direction have substantially equal gradation value, and the pixel of the defective portion has a different gradation value. According to this method, a non-defective image, that is, the reference image 403 can be synthesized from the defect image 404 excluding a case where the defect is very large as compared with the period.

As a result, after synthesizing the reference image 403, the CPU 1141 calculates a difference between the defect image 404 stored in the image memory 1143 and the synthesized reference image 403 to obtain a difference image, and compares the difference image with, for example, a predetermined threshold value to extract the defect 402, so that it is possible to calculate the position of the defect 402, that is, extract the defect (S204).

Therefore, without picking up or taking in the reference image, the CPU 1141 assumes that the plurality of pixels 407 distant as much as the periods from the area where any defect does not exist in the representative period direction have substantially the equal gradation value, and the pixel of the defective portion has the different gradation value. Consequently, it is possible to synthesize and generate the reference image (non-defective pattern in which any defect does not exist) 403 from the defect image 404. As a result, it is possible to extract the position of the defect based on the difference image between the defect image 404 and the synthesized reference image 403.

Next, in response to the instruction from the whole control unit 113, the electron microscope (SEM) picks up a high-magnification image centering on the extracted defect position to store the image in the image memory 1143 (S205). Thereafter, the CPU 1141 performs non-defective pattern estimation processing (S206) with respect to the high-magnification image in accordance with the non-defective pattern estimation program stored in the program memory 1142 again in response to the instruction from the whole control unit 113. The CPU 1141 subjects the high-magnification image to defect extraction processing (S207) in accordance with the defect extraction processing program stored in the program memory 1142.

Figure 8A:
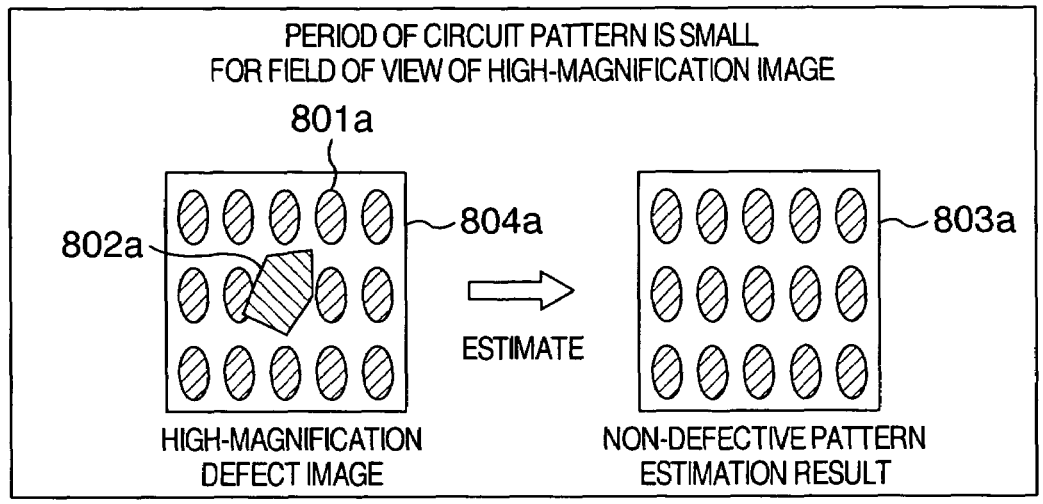
FIG. 8A is a diagram showing a method of estimating a non-defective pattern from a high-magnification defect image to prepare a reference image in a case where a period of a circuit pattern is small for a field of view of a high-magnification defect image.

In the estimation processing (S206) with respect to the high-magnification image, for example, as shown in FIG. 8A, in a case where a period of a circuit pattern 801*a* existing in a background portion of a defect 802*a* is sufficiently small as compared with a field of view in a high-magnification defect image 804*a*, it is possible to estimate a high-magnification non-defective pattern image 803*a* by a method similar to the method of estimating the non-defective pattern from the low-magnification defect image in S203.

Figure 8B:
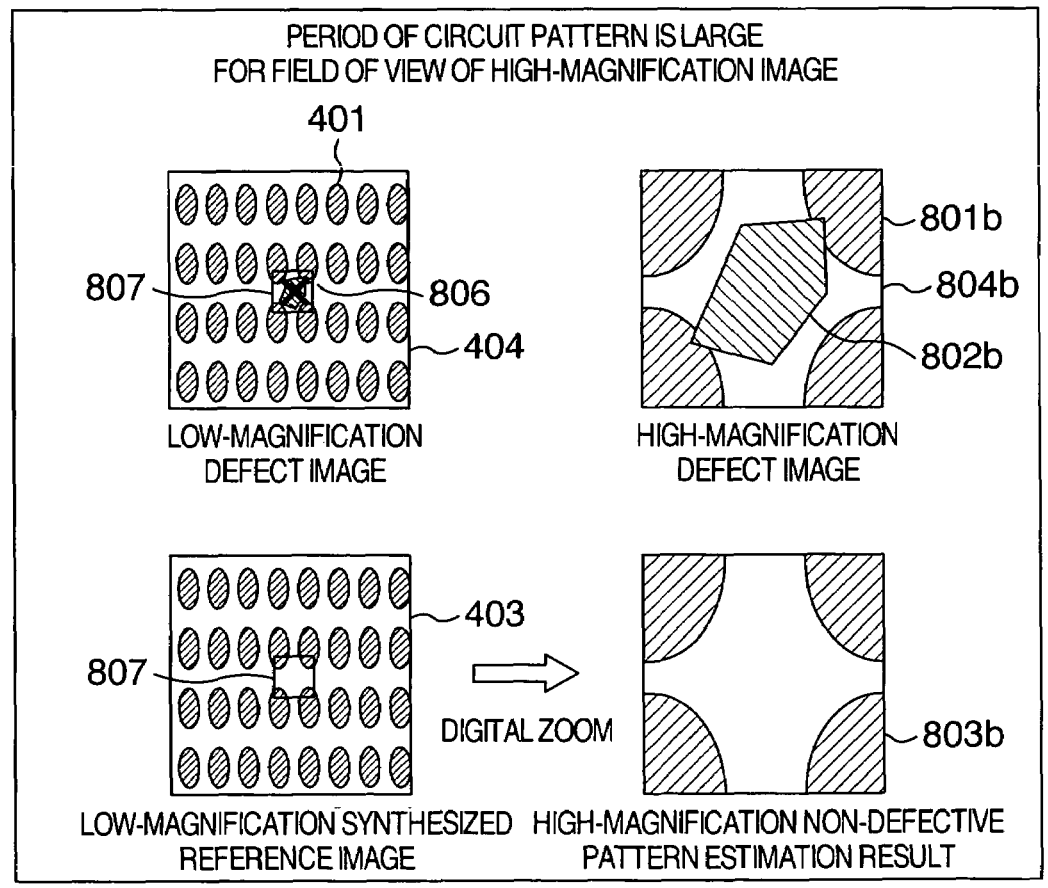
FIG. 8B is a diagram showing a method of estimating the non-defective pattern from the high-magnification defect image to prepare the reference image in a case where the period of the circuit pattern is large for the field of view of the high-magnification defect image.

On the other hand, a defect image 804*b* is acquired at a high magnification as shown in FIG. 8B. As a result, in a case where the field of view picked up as the image is smaller than the period of a repeated pattern 801*b* present in the background of the defect image, that is, the period of the repeated pattern 801*b* present in the background portion of a defect 802*b* is comparatively large with respect to the field of view, it is difficult to estimate a non-defective pattern image 803*b* from one high-magnification defect image 804*b* by the same method as that of the processing of S203. In this case, an estimated image of the non-defective pattern prepared in the processing S203, that is, a synthesized reference image 403 is used.

Specifically, the CPU 1141 stores an image pickup center coordinate value 806 during image pickup, when the high-magnification defect image 804*b* is acquired in the image memory 1143. A view field 807 of the low-magnification reference image 403 corresponding to the image pickup center coordinate value 806 is calculated, and an image of the view field is digitally enlarged (digitally zoomed). Accordingly, the high-magnification synthesized reference image 803*b* is prepared and stored in the image memory 1143 (S206). It is to be noted that in the description up to now, needless to say, the object image is not limited to an image such as a secondary electron image or a reflected electron image in the reference image synthesis processing.

It is to be noted that a non-defective state estimation calculating function section 1141a of the CPU 1141 executes S203, S204, and S206.

Next, a defect classifying function section 1141b of the CPU 1141 performs defect extraction processing (ADR processing) (S207). In the defect extraction processing, a position of the defect existing in the view field of the acquired high-magnification defect image is automatically checked. That is, the defect extraction processing calculates an image difference between the high-magnification defect image 404 and the high-magnification synthesized reference image 403 which is a non-defective pattern estimation result, and automatically recognizes, as a defect, a position on the difference image where a difference of the gradation value is large.

Figure 9A:
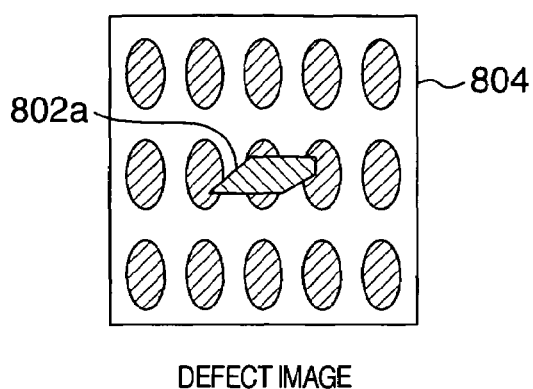
FIG. 9A shows a high-magnification defect image.
Figure 9B:
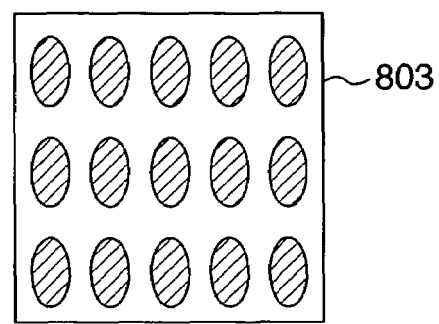
FIG. 9B shows a synthesized reference image.
Figure 9C:
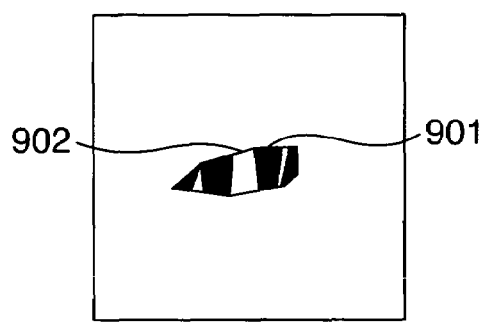
FIG. 9C shows a binarized image of a difference image between the defect image of FIG. 9A and the synthesized reference image of FIG. 9B.

As shown in FIG. 9C, a difference image obtained by calculating a difference between a defect image 804 shown in FIG. 9A and a synthesized reference image 803 shown in FIG. 9B is binarized by an appropriate threshold value, and an only pixel having a large difference value is displayed in black. A black area is referred to as a label 901 here. When a defect is superimposed on a plurality of background circuit patterns in this manner, one defect is obtained as a set of a plurality of labels. In this case, as a method of representing an area of the whole defect, for example, there is a method of calculating a convex closure 902 of the label. In this case, it is assumed that the whole area surrounded with the convex closure is regarded as an area where the defect exists. It is to be noted that in the actual processing, a defect label is sometimes erroneously detected because a noise signal included in the image subtly differs between the defect image and the reference image. For example, preprocessing may be performed to subject a label area to threshold value processing and accordingly remove a label having a small size from convex closure calculation objects.

Next, the defect classifying function section 1141b of the CPU 1141 performs defect classification processing (ADC processing) (S208). The defect classification processing classifies the respective defects into a plurality of classes by use of several standards. For example, a shape of the defect existing in the high-magnification defect image is recognized by use of the high-magnification defect image 404 obtained from the defect extraction processing (ADR processing) and the high-magnification synthesized reference image 403 (each image is constituted of a secondary electron image or a reflected electron image). Alternatively, a non-flat state of a section of the defect is checked, or the position of the defect is checked with respect to the circuit pattern of the background (e.g., the defect bridges wiring lines, exists on one wiring line, or exists in an area where any wiring line is not disposed) to judge criticality.

It is to be noted that the ADC processing mentioned herein means characterizing of the defect in a broad sense. The defect is quantitatively evaluated by use of various types of measures (e.g., information such as size, brightness, and pattern, three-dimensional information such as non-flatness and height, position relation with a surrounding pattern, and information indicating that the wiring line short-circuits or disconnects in a case where the defect is a shape change of the wiring line) with respect to the defect. Alternatively, it is meant that the label (e.g., foreign matter or pattern defect) of a classification class categorized depending on a characteristic of the defect is added to the defect. In this respect, the ADC processing, defect classification, and defect characterizing have the same meaning.

Figure 10A:
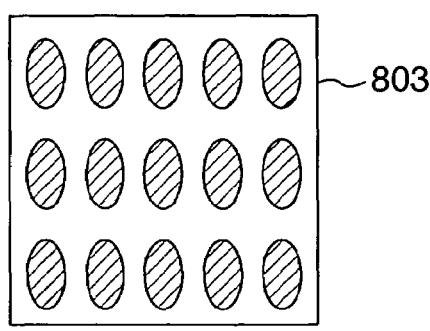
FIG. 10A is a diagram of the synthesized reference image.
Figure 10B:
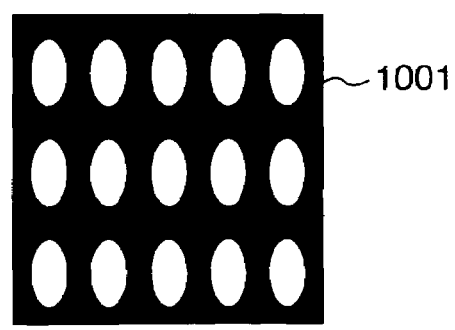
FIG. 10B is a diagram of the binarized image of the synthesized reference image of FIG. 10A.

That is, in the defect classification processing (ADC processing), the following several processing are performed. First, wiring recognition processing is performed. A portion in the field of view of the high-magnification image is identified as a wiring pattern or a non-wiring pattern (i.e., substrate). Specifically, the position of the circuit pattern is recognized from the synthesized high-magnification reference image 803. FIG. 10B shows that the synthesized reference image 803 shown in FIG. 10A is subjected to binary processing. Cells are shown in white, and the substrate is shown in black to display a result image 1001 recognized by the binary processing by use of information indicating that cell (circuit pattern) portions are darker than the substrate portion of the background. The present processing result 1001 indicates that each processing of the reference image 803 corresponds to the wiring portion (circuit pattern) or the substrate.

Figure 11:
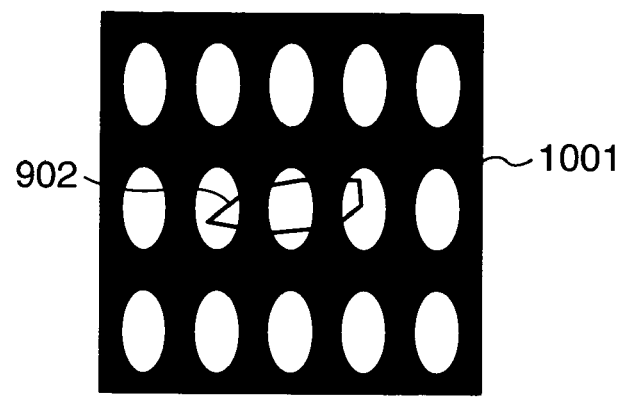
FIG. 11 is an explanatory diagram of one embodiment of area criticality judgment processing in ADC processing.

Next, the CPU 1141 performs defect area criticality judgment processing. This is processing to superimpose the defect convex closure 902 onto the wiring recognition result 1001 obtained beforehand as shown in FIG. 11, and the position of the defect with respect to the wiring pattern is judged. In the present embodiment, it can be recognized that the convex closure 902 is superimposed on the three cells. According to the present processing, as described in the present embodiment, in addition to a characteristic that the defect "bridges a plurality of wiring patterns", characteristics that the defect "exists on a single wiring pattern" and that the defect "exists on the substrate" can be added to the respective defects.

Figure 12A:
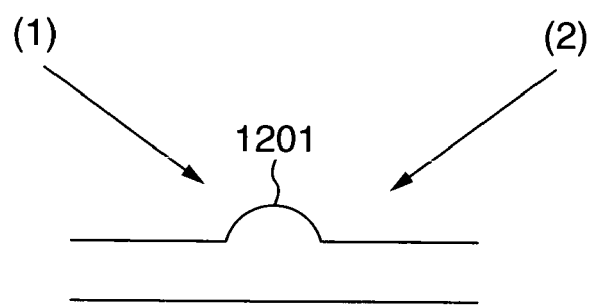
FIG. 12A is a sectional diagram of a sample showing a direction in which an electron reflected from a defect having a protruding shape is detected.
Figure 12B:
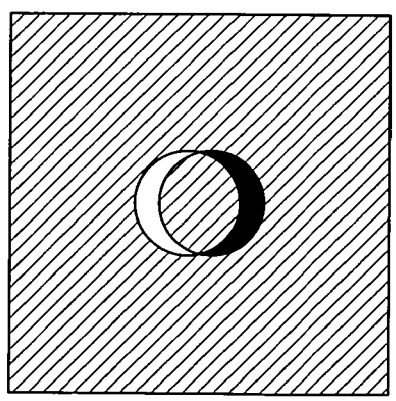
FIG. 12B is a diagram showing an image obtained by detecting the reflected electron from direction (1)
Figure 12C:
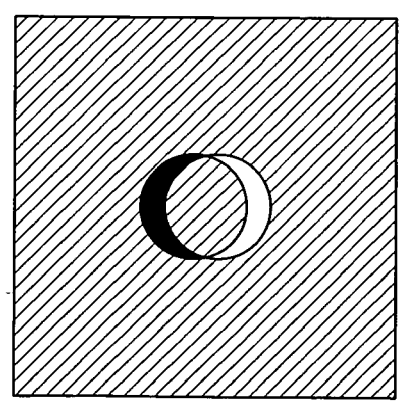
FIG. 12C is a diagram showing an image obtained by detecting the reflected electron from direction (2)

Next, the CPU 1141 recognizes a non-flat state of the defect. This recognition uses a reflected electron image obtained by detecting the reflected electron 119 with two facing reflected electron detectors 120a, 120b and stored in the image memory 1143. FIGS. 12B and 12C schematically show two reflected electron images obtained by picking up an image of a defect 1201 whose surface is provided with a protruding shape such as an attached foreign matter shown in FIG. 12A. FIGS. 12B and 12C show images picked up by the detectors 120a, 120b from directions (1) and (2) in the respective view fields, and shade of the foreign-matter defect is generated in an opposite direction. When a substance having the protruding shape is observed with the left and right facing reflected electron detectors 120a, 120b in the scanning electron microscope, as shown in FIG. 12B, the image is obtained in which shade is seen in a direction similar to that of the shade obtained at a time when the substance is irradiated with illuminative light from the direction (1) (bright component is seen in the direction (1), and a shadow is seen in the direction (2)). In FIG. 12C, the shade is formed in the opposite direction.

Figure 13A:
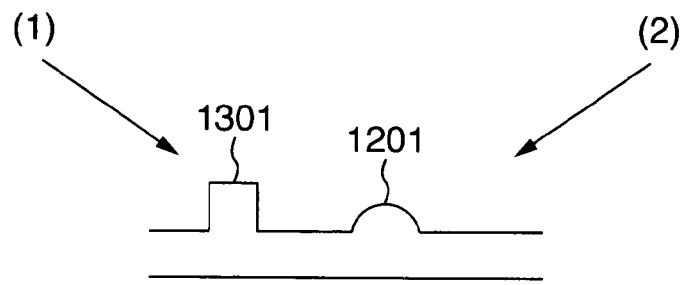
FIG. 13A is a sectional diagram of the sample showing the direction in which the electron reflected from a defect whose surface is provided with a non-flat pattern.
Figure 13B:
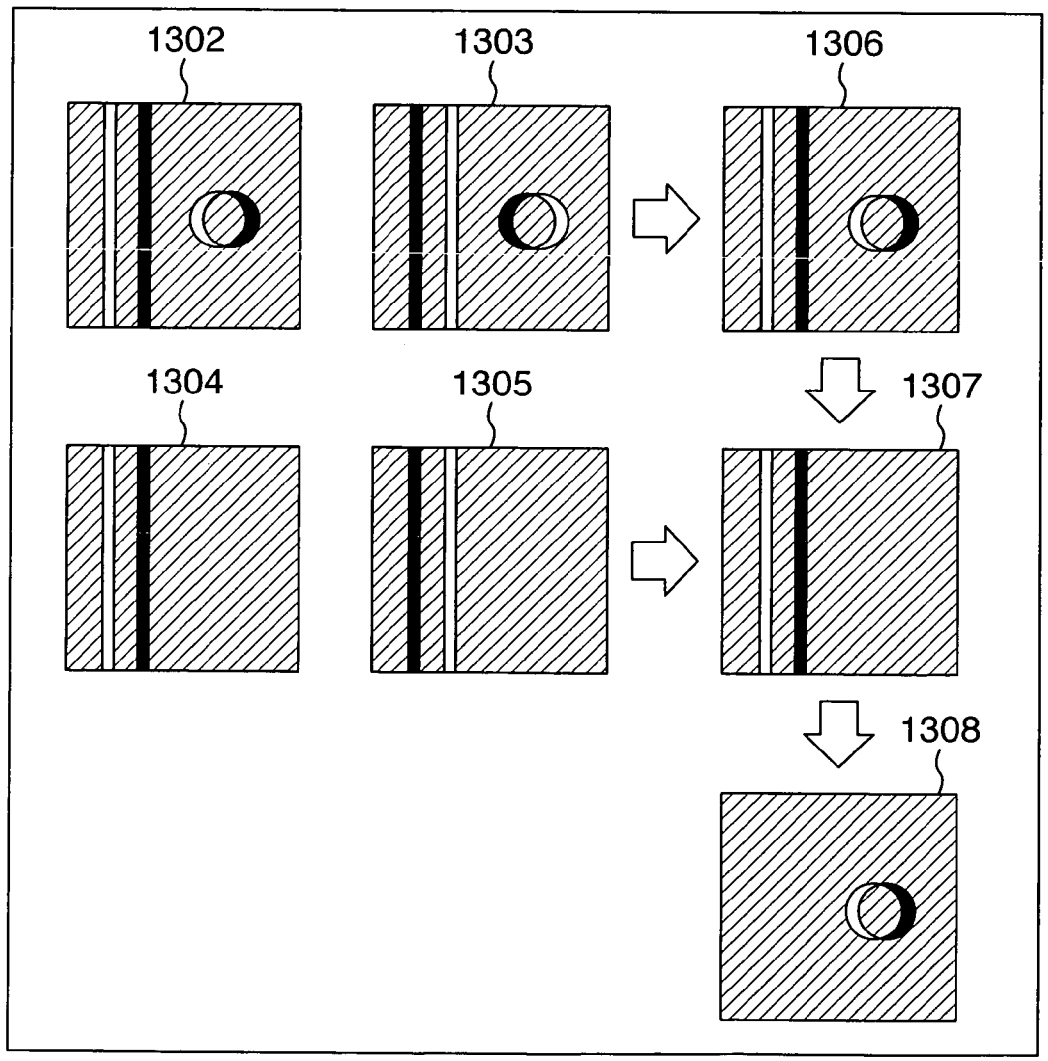
FIG. 13B is a diagram showing contents of a processing procedure to process an image formed by the reflected electron detected from directions (1) and (2), respectively, to judge non-flatness of the defect.

A processing procedure for recognizing non-flatness is shown in FIG. 13. Since a wiring pattern 1301 formed on an actual sample surface has recessed and protruding shapes as shown in FIG. 13A, the shades formed by wiring lines and defects are mixed on reflected electron images 1302, 1303. Therefore, the processing which is not influenced by the pattern non-flatness judgment is required for judging the non-flatness of the defect. First, difference images are calculated between defect images (1302 and 1303) and synthesized reference images (1304 and 1305) obtained by estimating the non-defective patterns from the reflected electron images to thereby acquire images having emphasized shade components for the defect and reference images, respectively (1306 and 1307). Next, a difference between two resultant images 1306 and 1307 is calculated, and non-flatness information of the wiring pattern of the background is removed to acquire an image in which the non-flatness information of the defect is visualized (1308). Moreover, a direction in which a shade slope exists, specifically a relative positional relation between white and black portions in the drawing is checked from this image to judge whether the defect is the recessed portion or the protruding portion. When white exists on the right side of black, the defect is the protruding portion. In a converse case, the defect is the recessed portion.

Next, the CPU 1141 calculates characteristic amount data from the image and processing result obtained up to now. This characteristic amount is a quantitative numerical value which can be calculated from the image. Examples of the value include a size of the defect calculated from the convex closure of the defect, and average brightness of the secondary electron images inside the convex closure. Finally, final defect characterizing, that is, defect classification is performed based on various types of data calculated up to now. In the embodiment shown in FIG. 13, since the defect has a protruding surface structure, it is the foreign matter in many cases. It is judged that the defect exists on the substrate. As another classification method, statistic classification may be performed using defect area or brightness information. In this case, several tens to hundreds of sample defect data are acquired for a plurality of different classes whose origins are known, similar characteristic amounts are calculated from these data, and teaching data is beforehand prepared by checking statistic properties present in the characteristic amounts for each class. Moreover, the characteristic amount of a classification object is compared with the teaching data to judge the class to which the defect belongs. The classification sequence of each defect described up to now will be continued until the sequences for all of the defects as reviewing objects are ended (S209).

Next, there will be described an embodiment in which the images picked up in the above-described processing sequences are successively displayed in the input/output unit. That is, when the images picked up by the processing sequence in FIG. 2 are successively displayed in the input/output unit 117, a user can visually confirm a processing process. For example, since the low-magnification defect image 404 and the high-magnification defect image 804 are picked up for each defect in the sequence of FIG. 2, two images 404, 804 are displayed in this order. When the only image picked up in this manner is displayed, it is easily seen that the stage does not pick up the image of the non-defective pattern. The estimated non-defective pattern images 403, 803 generated inside can be displayed in the same screen. In this case, when it is displayed that the image indicates an estimation result, the user can easily confirm that the image is not actually picked up. It is to be noted that as described herein, the acquired or synthesized image may be output to the input/output unit 117 in another sequence as described below.

Embodiment 2

Figure 3:
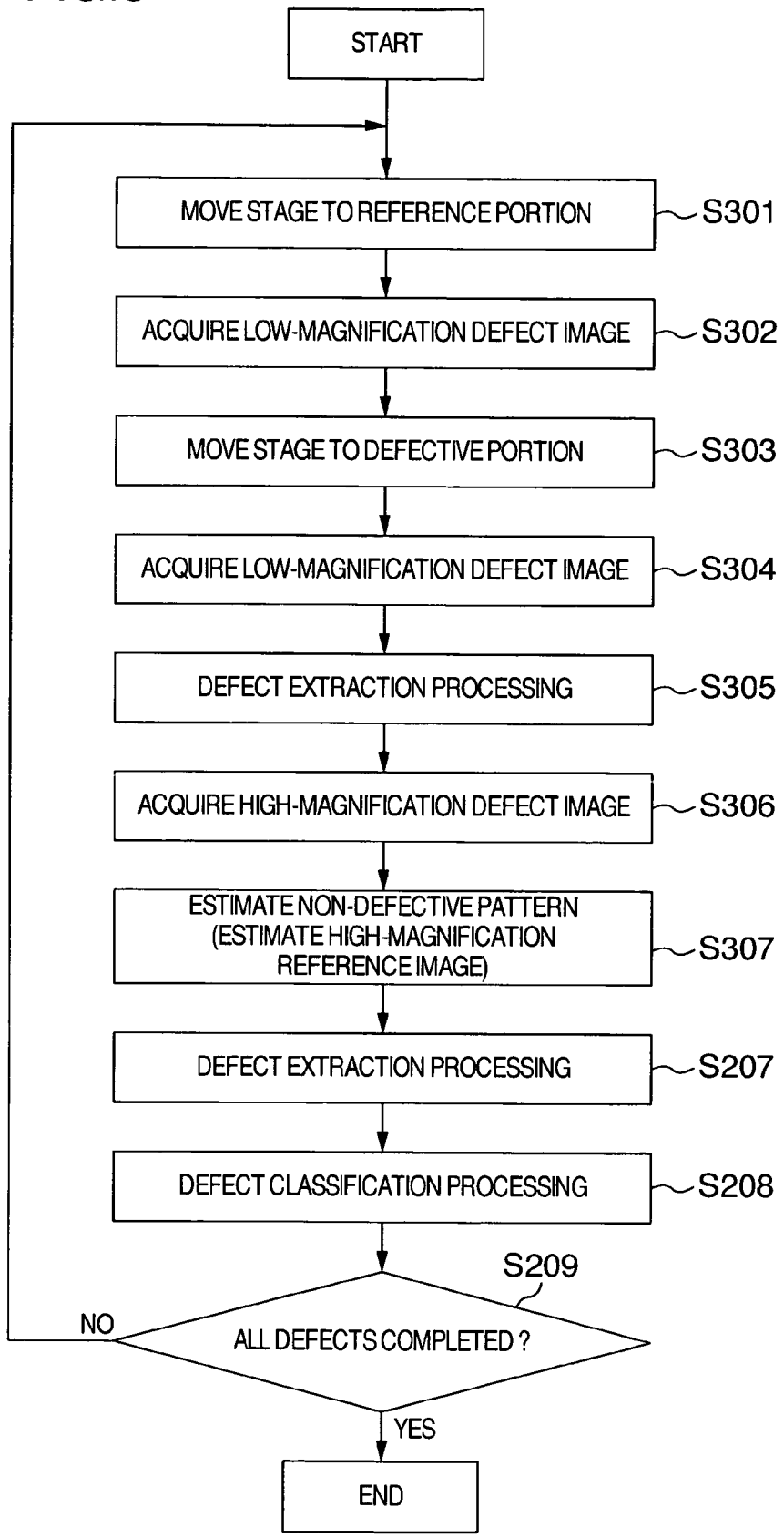
FIG. 3 is a processing flowchart showing a second embodiment of the ADR and ADC processing by use of the defect reviewing apparatus.

Next, there will be described a second embodiment of ADR and ADC processing using a defect reviewing apparatus of the present invention. In the second embodiment, a circuit pattern of a background whose image is picked up as a defect SEM image is a circuit pattern which does not have periodicity as in a logic circuit portion. The embodiment relates to a sequence in which a reference SEM image is picked up, and processing contents are shown in FIG. 3. In the first embodiment, the ADR/ADC processing sequence has been described above in a case where the defect exists on the repeated memory cell pattern portion or the like. In the second embodiment, there will be described an ADR/ADC processing sequence in a case where the defect exists on the circuit pattern (e.g., FIG. 14) which does not have any periodicity as in the logic circuit portion.

Figure 14:
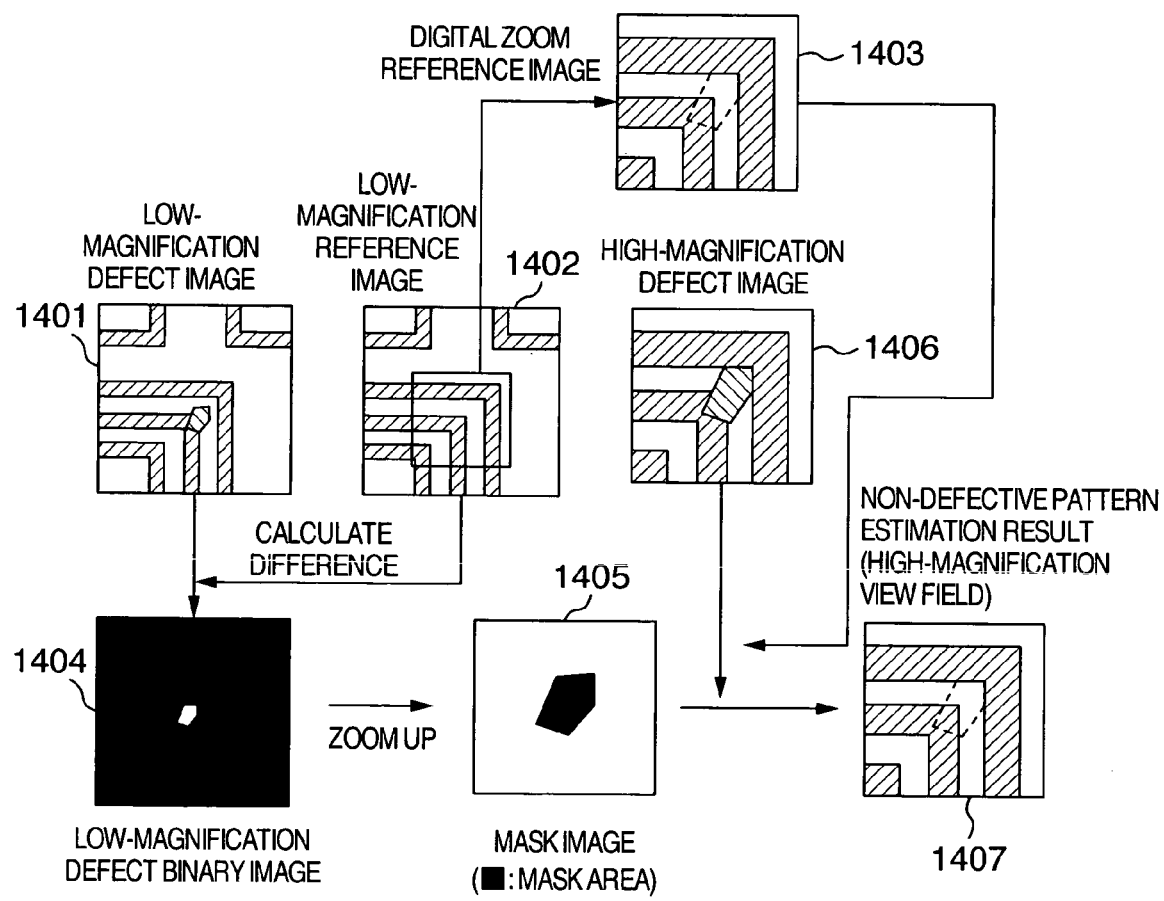
FIG. 14 is an explanatory drawing showing one embodiment to estimate a non-defective pattern image at a high magnification in a non-repeated pattern.

In a defect image and a reference image schematically shown in FIG. 14, a substrate pattern is shown in white, and a wiring pattern is shown in gray. In this case, first, a stage is moved so that a reference pattern in which any defect does not exist enters a field of view (S301), and a reference image 1402 is acquired at a low magnification (S302). This reference pattern refers to an area in which any defect does not exist in an area where the same circuit pattern as that of a defective portion is formed, but examples of the pattern include an area in which a coordinate of a defective portion is the same as that in a chip as to adjacent chips in a semiconductor wafer formed by arranging a large number of identical chips. Subsequently, the stage is moved to a defect position (S303), and a defect image 1401 is acquired at a low magnification (S304). Next, a CPU 1141 calculates a difference between the resultant low-magnification defect image 1401 and the reference image 1402 to extract the defect position (S305). Next, a high-magnification defect image 1406 is acquired centering on the defect position (S306). Next, the CPU 1141 regards the high-magnification defect image 1406 as an object, and estimates the non-defective pattern, that is, synthesizes a reference image 1407 (S307).

As the simplest method in this system, a partial image 1403 positioned in a field of view of the high-magnification defect image is digitally zoomed by use of the low-magnification reference image 1402 acquired beforehand. Such digital zooming is a simple technology. However, in a case where a magnification ratio between the low and high magnifications is large, it is difficult to obtain the estimated image 1403 from the high-magnification reference image having a sufficient resolution. In this case, the following method can be applied. In this method, a defect extraction result 1404 in the low-magnification image is used as a mask, the mask is zoomed and enlarged at the high magnification, and a zoom-enlarged mask image 1405 is superimposed on the high-magnification defect image 1406 to obtain an area which is presumed to be a non-defective portion in the view field of the high-magnification defect image. Partial images of image data of the corresponding area are laminated to synthesize the high-magnification reference image 1407. For example, in FIG. 14, reference numeral 1404 denotes a low-magnification defect binary image obtained by binarizing the difference image between the acquired low-magnification defect image 1401 and the reference image 1402 by use of a certain threshold value, and a white portion mans the defect area.

The image is zoomed up so as to obtain the same view field as that of the high-magnification defect image, and white and black portions are reversed to obtain the mask image 1405. In this case, an area which turns to black means an area having a high possibility of being a defect. That is, this indicates a high possibility that a portion (white portion) other than this mask area is a normal pattern. Therefore, in a case where the high-magnification defect image 1406 is superimposed on this mask image 1405, when a masked portion in the area is estimated by use of image data of a non-masked area of the high-magnification defect image 1406, the high-magnification non-defective reference image 1407 having sufficient resolution is estimated.

Figure 15:
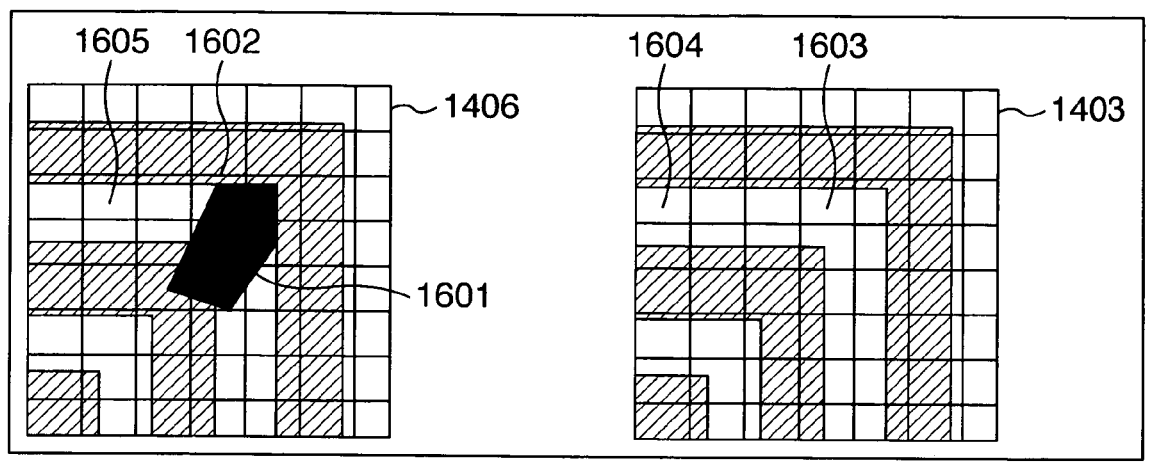
FIG. 15 is an explanatory diagram of a procedure to synthesize the reference image.

A more typical system is shown in FIG. 15. The high-magnification defect image 1406 is divided into a plurality of rectangular images, and the image 1403 is obtained by digitally zooming the same view field as that of the low-magnification reference image 1402 in each rectangular area (e.g., rectangular area 1602) including a mask area 1601. From the image, a rectangular area (1603) corresponding to the area (1602) is selected. Next, a rectangular area which is apparently similar to a pattern of the area and which is not included in the mask area 1602 is searched from the digital zoom reference image 1403 by a pattern matching method (e.g., 1604 is searched in the present example). Finally, rectangular image data 1605 in a position where the high-magnification defect image 1406 is searched is attached to the presently noted rectangular area (1602 in the present example). When the present processing is performed on a whole segment area including the mask area 1601, the high-magnification reference image 1407 is synthesized.

It is to be noted that a non-defective state estimation calculating function section 1141a of the CPU 1141 executes S305 and S307.

Subsequently, a defect classifying function section 1141b of the CPU 1141 performs defect extraction (S207) and defect classification processing (S208) by the same method as that described above in the first embodiment with reference to FIG. 2.

Figure 5:
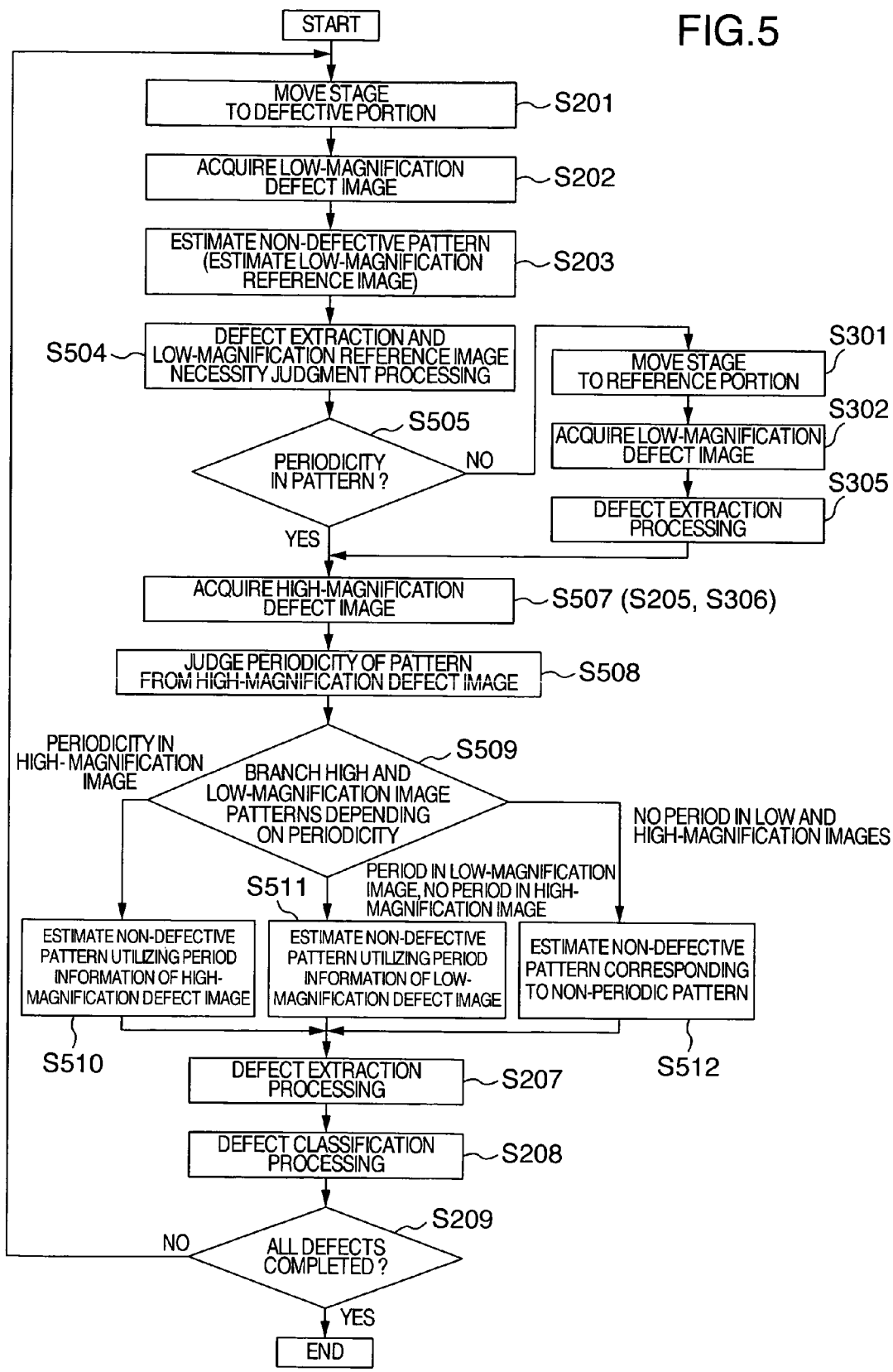
FIG. 5 is a processing flowchart showing a third embodiment of the ADR and ADC processing using the defect reviewing apparatus.
Figure 6:
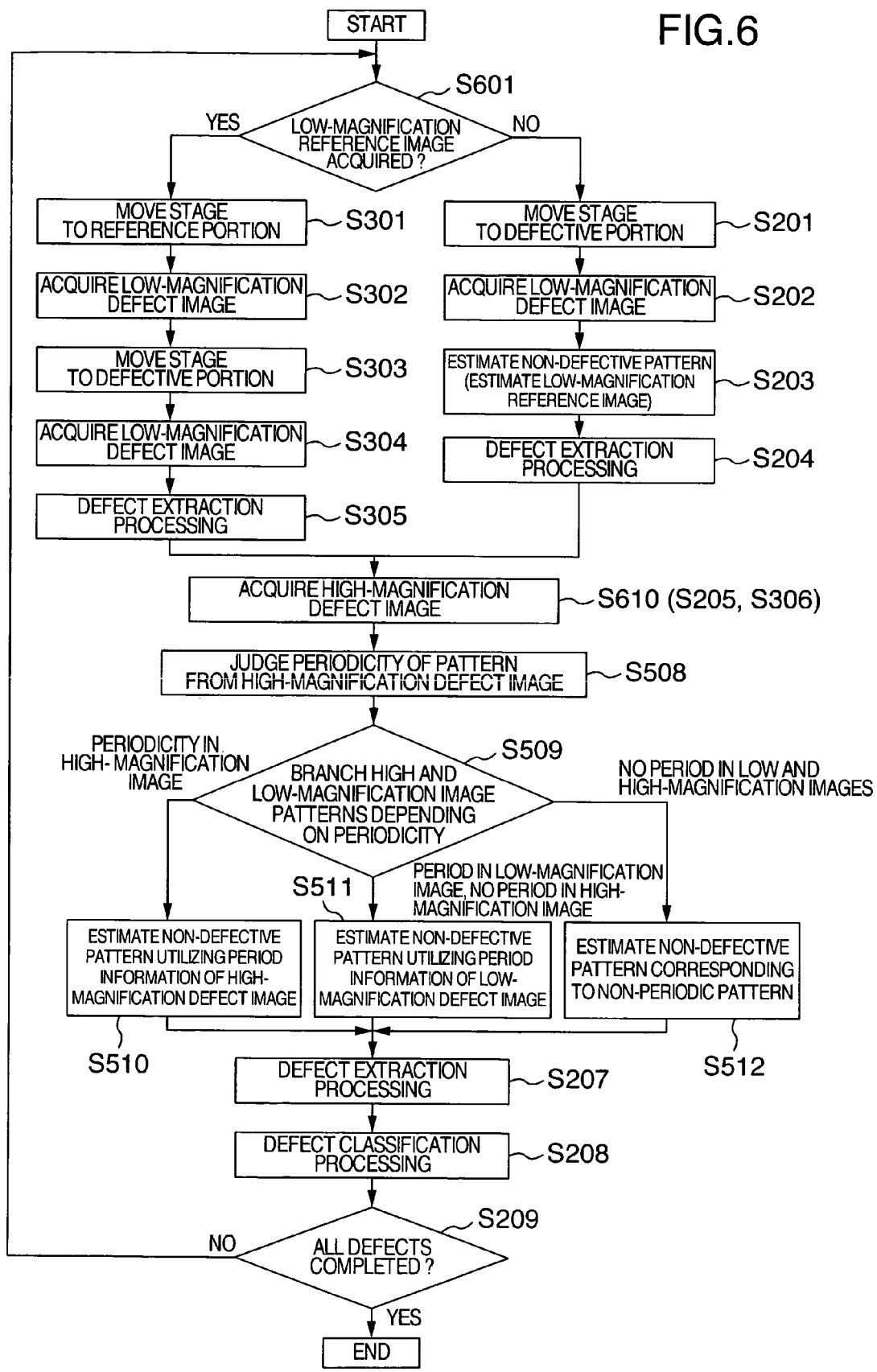
FIG. 6 is a processing flowchart showing a fourth embodiment of the ADR and ADC processing using the defect reviewing apparatus.
Figure 7:
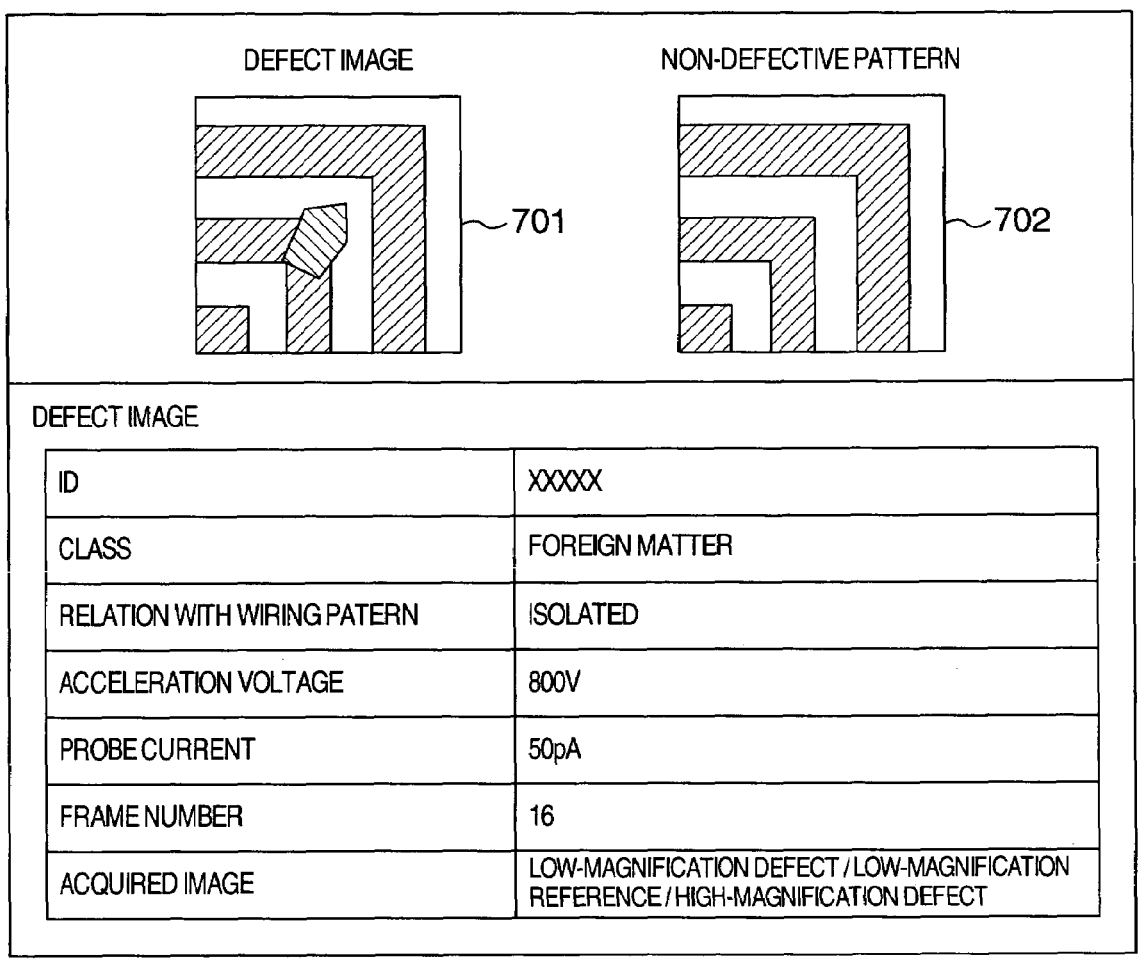
FIG. 7 is a diagram showing a display example of a defect classification result obtained in the first to fourth embodiments using the defect reviewing apparatus.

FIG. 7 shows one example of a screen in which a classification result obtained for each defect by sequences of FIGS. 2, 3, 5, and 6 is displayed in an input/output unit 117. In the drawing, reference numeral 701 denotes a high-magnification defect image, and 702 denotes an image of a presumed non-defective pattern. FIG. 7 shows classification results together with conditions (accelerating voltage, etc.) during image pickup and types of actually acquired images (three types are acquired: a low-magnification defect; a low-magnification reference; and a high-magnification defect, and a high-magnification reference image is synthesized in the second embodiment). It is to be noted that in the first embodiment, two types are acquired: a low-magnification defect; and a high-magnification defect, and the high-magnification reference image is synthesized.

Embodiment 3

Next, there will be described a third embodiment of ADR and ADC processing using a defect reviewing apparatus according to the present invention. In the first and second embodiments, the ADR/ADC sequence has been described above in the case where the defects exist on the repeated pattern and a non-repeated pattern such as the logic pattern, respectively. The repeated pattern and the non-repeated pattern are mixed on an actual semiconductor wafer in most cases. There is a restriction on the first embodiment in that the embodiment is applicable to a part of the wafer. The second embodiment functions in a repeated pattern portion without any problem, but the applying of the second embodiment to all areas is not suitable in the respect of throughput. The third embodiment described herein relates to a defect reviewing apparatus provided with a function of judging whether either of the systems of the first and second embodiments is to be used.

A sequence of the third embodiment is shown in FIG. 5. First, as described in the first embodiment, a stage is moved so that a defect portion enters an image pickup view field (S201), and a low-magnification defect image 404 is acquired (S202). Next, a CPU 1141 synthesizes a low-magnification reference image 403 (S203). Subsequently, the CPU 1141 automatically judges whether the synthesis processing becomes successful or fails (S504). When it is judged in this judgment processing that the synthesis fails, as described in the second embodiment, the stage is moved to a reference pattern (S301), a low-magnification reference image 1402 is acquired (S302), defects are extracted from a low-magnification defect image 1401 obtained in S202 and the low-magnification reference image 1402 acquired in S302 (S305), and the image of the defect is picked up at the high magnification centering on the extracted defect position to acquire a high-magnification defect image 1406.

Judgment processing S504 is performed using a plurality of judgment standards. A first judgment condition is judgment of success/failure of period calculation. In processing to presume a non-defective pattern in S203, as described in the first embodiment, a period is calculated in a step of the synthesis processing of the reference image shown in FIG. 4C. Here, the period is calculated using a correlation coefficient as described in the first embodiment, but in a case where a maximum value of this correlation coefficient is smaller than a certain threshold value, it is judged that the period cannot be calculated, that is, the synthesis of the reference image 403 fails. In the first embodiment, it has been described that four periods are calculated from one image by use of four templates, but in this case, it is judged that the synthesis of the reference image fails unless the calculations of four periods are all successful.

Figure 16:
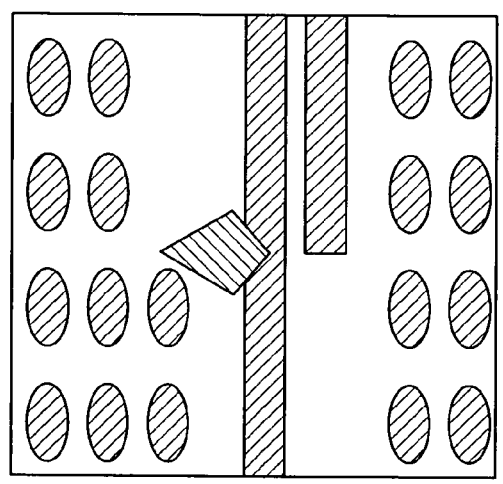
FIG. 16 is a diagram showing a typical example of a defect image in a case where one plane of a field of view is not formed in a period pattern and there is a possibility that period calculation is judged to be successful according to the present invention.

Next, there will be described a second judgment condition on which failure in synthesizing the reference image is judged in a case where the period calculation is successful. FIG. 16 shows a typical example of a case where a repeated pattern exists in a partial area only instead of a whole view field, and there is a possibility that the period calculation is successful depending on the threshold value applied to the correlation coefficient. In the present example, there is a danger that the synthesis of the reference image is not successful with respect to a central area of the field of view. When the synthesis of the reference image fails, many defect labels due to erroneous judgment exist in the resultant defect extraction result. Therefore, standards are set with respect to an area of this label, the total number of the labels, and an area of a convex closure with respect to the label. When any of the data does not satisfy the standard, it is judged that the synthesis of the reference image fails. If the standards are strictly set so as to prevent the failure in the synthesis of the reference image from being erroneously judged to be successful in the present processing, a case where the success of the reference image synthesis is erroneously judged to be failure is generated a little, but it is possible to securely judge a failure case.

Next, when the CPU 1141 judges in step S505 that the synthesis of the low-magnification reference image 403 is successful (the low-magnification defect image has a periodicity pattern), a high-magnification defect image is acquired centering on the defect position extracted in S504 (S507 (S205)). Thereafter, a reference image (803a, 803b, or 1407) is synthesized with respect to a high-magnification image as described below. Even when this high-magnification reference image is presumed, a system suitable for the defect is judged (S508). Even this judgment processing can be performed using the periodicity judgment described above. That is, when the CPU 1141 judges in S508 that a repeated component is included in a background pattern with respect to the high-magnification defect image acquired in S507, as shown in FIG. 8A, the high-magnification reference image 803a can be synthesized (S510 (S206)) from the high-magnification defect image 804a only. When it is judged in S508 that the repeated component is not included in the high-magnification defect image, as shown in FIG. 8B, the high-magnification reference image 803b can be synthesized by digitally zooming the low-magnification synthesized reference image 403 (S511 (S206)).

On the other hand, in a case where the CPU 1141 judges in the step S505 that the synthesis of the low-magnification reference image 403 fails (the low-magnification defect image does not have any periodicity pattern) and that the reference image needs to be acquired, when the CPU 1141 judges in step S508 that the high-magnification defect image does not have any periodicity pattern, as described in the second embodiment, a ratio between low and high image pickup magnifications is compared with a reference value beforehand set to the ratio. When the ratio is larger than the reference value, as shown in FIG. 14, a reference image synthesis method (S512 (S307)) is performed using the low-magnification defect image 1401 acquired in S202, the low-magnification reference image 1402 acquired in S302, and the high-magnification reference image 1406 acquired in S507. When the ratio is smaller than the reference value, the reference image 1403 is synthesized (S511) by digitally zooming the low-magnification reference image 1402.

It is to be noted that in step S509, the processing is branched depending on pattern periodicities of the high and low-magnification defect images. A non-defective state estimation calculating function section 1141a of the CPU 1141 executes S203, S504, S505, and S508 to S512.

Thereafter, a defect classifying function section 1141b of the CPU 1141 performs defect extraction processing (S207) and defect classification processing (S208) by the method described in the first embodiment.

According to the third embodiment, the suitable sequence and reference image synthesis method are selected depending on the characteristics of the background patterns of the respective defects.

Embodiment 4

Next, there will be described a fourth embodiment of ADR and ADC processing using a defect reviewing apparatus according to the present invention. In the third embodiment, it has been described above that the ADR/ADC processing of each defect, specifically the method of synthesizing the reference image is changed using image processing, but the judgment of the processing system suitable for each defect is not limited to utilization of automatic judgment by means of the image processing. For example, in the whole control unit 113, information of a position coordinate of the defect on a sample inspected with an inspection device (not shown), obtained via a network (not shown) or the like, and stored as a recipe file in a recipe unit 116 is compared with, for example, design data such as CAD of the sample input from a CAD system (not shown) and stored in the recipe unit 116. Accordingly, information indicating a defect existing on a repeated pattern or in a non-repeated pattern area is beforehand stored in, for example, the recipe unit 116. In this case, it is supposed that the information is read from, for example, the recipe unit 116 by the CPU 1141 of an image processing unit 114, and the ADR/ADC processing is performed in each suitable sequence.

Additionally, instead of using design data such as CAD, an image such as an image of a whole surface of a chip or an optical microscope image of a part of the surface is display in a display screen of a monitor of an input/output unit 117, a user designates, on the screen, an area to be subjected to one or more processing of the first and second embodiments, and a position coordinate of each defect obtained from the inspection device is compared with contents. Accordingly, a mode for use in performing the ADR/ADC processing can be switched.

Moreover, as another embodiment, a result of the inspection device is usable. There is an inspection device which switches an inspection method by use of information indicating the area of the chip which is a repeated pattern area during the inspection of the defect. Such inspection device outputs, together with an inspection result, inspection conditions that each defect has been inspected in either of repeated and non-repeated portion modes. In this case, when the information of the inspection result output from the inspection device is beforehand stored in a recipe unit 116, the CPU 1141 can determine a mode to perform ADR/ADC by use of this information.

A processing sequence of the fourth embodiment is shown in FIG. 6. To start the ADR/ADC processing with respect to each defect, the CPU 1141 first judges the mode of the defect, and more specifically judges whether or not the low-magnification reference image needs to be acquired (S601). As described above, this judgment utilizes comparison results of the position coordinate of the defect obtained from the inspection device and the CAD data. As to the defect for which the reference image is required, a stage is moved to a reference portion, a low-magnification reference image is picked up, the stage is moved to a defective portion, a low-magnification defect image is picked up, and a defect is extracted (S301 to S305).

On the other hand, as to the defect for which any reference image is not required, the stage is moved to the defective portion, a low-magnification defect image is acquired, a non-defective pattern is presumed, and a defect is extracted (S201 to S204). After acquiring a high-magnification defect image (S610 (S205, S306)), periodicity of a pattern is judged from the high-magnification defect image (S508), and thereafter system judgment processing is performed with respect to a method of synthesizing a high-magnification non-defective pattern (S509). Here, the processing is switched depending on whether or not the reference image is acquired in a low-magnification image pickup sequence, and depending on the ratio between the low and high magnifications.

As to the defect existing in a cell area, when a period of the defect is beforehand judged to be smaller than that of a high-magnification view field, a pattern estimation system (S510) using the high-magnification defect image is performed. When the period is comparatively large as compared with the high-magnification view field, and any low-magnification reference image is not acquired, a system to digitally zooming a low-magnification synthesized reference image is performed (S511). When the reference image is acquired, and a ratio between low and high image pickup magnifications is larger than a predetermined reference value, as described in the second embodiment, the method of synthesizing the reference image is performed using the low-magnification defect image, the low-magnification reference image, and the high-magnification defect image (S512). When the ratio is smaller than the reference value, the reference image synthesis processing is performed by means of digital zooming (S511).

It is to be noted that a non-defective state estimation calculating function section 1141a of the CPU 1141 executes S601, S203, S204, S305, and S508 to S512.

Thereafter, a defect classifying function section 1141b of the CPU 1141 performs defect extraction processing (S207) and defect classification processing (S208). The ADR and ADC processing is performed in the sequence suitable for each defect in the same manner as in the above-described third embodiment.

It is to be noted that the above-described first to fourth embodiments are also applicable to an optical defect reviewing apparatus (review device).

As described above, according to the present embodiments, it is possible to realize high-precision ADR and ADC processing with a high throughput in the defect reviewing apparatus whose objects are defects generated in a semiconductor wafer and the like.

Moreover, according to the present embodiments, a normal state (state in which any defect does not exist) of the same field of view is estimated from an image including an acquired defective portion in the field of view, and the defect can be characterized using the estimation result.

Furthermore, in the defect reviewing apparatus according to the present embodiment, it is not necessary to actually acquire an image of the normal portion in which any defect does not exist. Therefore, it is possible to rapidly enhance the throughput of image pickup as compared with a conventional technology.

In addition, even when the defects existing on the wafer are positioned in various positions on a period pattern of a memory cell, a non-period pattern of a logic circuit and the like, it is possible to execute an ADR sequence and ADC processing depending on the defect.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of reviewing a defect, comprising the steps of:
   utilizing an inspection apparatus to pick up an image of an area including a defect on a sample having a surface provided with a pattern, so as to acquire the image of the area on the sample including the defect with a first magnification;
   comparing the acquired image of the area on the sample including the defect with the first magnification with a reference image having the first magnification so as to extract a defect;
   picking up an image of an area on the sample including the extracted defect to acquire an image of an area on the sample including a defect with a second magnification which is larger than the first magnification;
   comparing the acquired image of the area on the sample including the defect with the second magnification with a reference image having the second magnification so as to extract a defect; and
   classifying the extracted defects depending on characteristic amounts of the defects,
   wherein the second magnification reference image is an image prepared by estimating a non-defective state which does not include any defect from the acquired image of the area including the second magnification defect.

2. The method of reviewing the defect according to claim 1, wherein the first magnification reference image is an image prepared by estimating a non-defective state which does not include any defect from the acquired image of the area including the first magnification defect.

3. The method of reviewing the defect according to claim 1, wherein the first magnification reference image is a first magnification image obtained by picking up an image of an area which is provided with the same pattern as that of the acquired area including the first magnification defect.

4. The method of reviewing the defect according to claim 1, wherein the second magnification reference image is prepared by extracting information of a pitch of a pattern formed on the surface of the sample included in the acquired image of the area including the second magnification defect.

5. The method of reviewing the defect according to claim 1, wherein the step of picking up the image of the area including the defect candidate on the sample to acquire the image of the area including the first magnification defect and the step of picking up the image of the area including the extracted defect to acquire the image of the area including the defect having the second magnification which is larger than the first magnification are performed using a scanning electron microscope.

6. The method of claim 1, wherein the image is picked up by use of information of a defect detected beforehand by another inspection device.

7. A method of reviewing a defect, comprising the steps of:
   utilizing an inspection device to pick up an image of an area including a defect on a sample having a surface provided with a pattern, so as to acquire the image of the area on the sample including the defect with a first magnification;
   comparing the acquired image of the area on the sample with the first magnification including the defect with a reference image having the first magnification so as to extract a defect;
   picking up an image of an area on the sample including the extracted defect to acquire an image of an area on the sample including a defect with a second magnification which is larger than the first magnification;
   comparing the acquired image of the area on the sample including the defect with the second magnification with a reference image having the second magnification so as to extract a defect; and
   classifying the extracted defects depending on characteristic amounts of the defects,
   wherein the second magnification reference image is an image prepared by estimating a non-defective state which does not include any defect from the acquired image of the area including the first magnification defect and the acquired image of the area including the second magnification defect.

8. The method of reviewing the defect according to claim 7, wherein the first magnification reference image is an image prepared by estimating a non-defective state which does not include any defect from the acquired image of the area including the first magnification defect.

9. The method of reviewing the defect according to claim 7, wherein the first magnification reference image is a first magnification image obtained by picking up an image of an area which is provided with the same pattern as that of the acquired area including the first magnification defect.

10. The method of reviewing the defect according to claim 7, wherein the second magnification reference image is prepared by extracting information of a pitch of a pattern formed on the surface of the sample included in the acquired image of the area including the second magnification defect.

11. The method of reviewing the defect according to claim 7, wherein the step of picking up the image of the area including the defect candidate on the sample to acquire the image of the area including the first magnification defect and the step of picking up the image of the area including the extracted defect to acquire the image of the area including the defect having the second magnification which is larger than the first magnification are performed using a scanning electron microscope.

12. The method of claim 7, wherein the image is picked up by use of information of a defect detected beforehand by another inspection device.

13. An apparatus for reviewing a defect on a sample, comprising:
 image acquiring means for picking up an image of the sample to acquire an image of the surface of the sample;
 table means for disposing the sample and controlling a position of the sample so that a desired area picture of the sample enters an image pickup view field of the image acquiring means;
 image processing means for processing the image obtained by picking up, by the image acquiring means, an image of the desired area on the sample whose position is controlled by the table means; and
 control means for controlling the image acquiring means, the table means, and the image processing means;
 wherein the control means controls the position of the table means so that the defect enters the view field of the image acquiring means, and
 the image processing means compares an image of an area including a defect having a first magnification acquired by the image acquiring means with a reference image having the first magnification to extract a defect, compares an image of an area including the defect obtained by picking up, by the image acquiring means, an image of an area including the extracted defect at a second magnification which is larger than the first magnification with a reference image having the second magnification prepared by estimating a non-defective state which does not include any defect from an image of an area including the defect to extract a defect, and classifies the extracted defects depending on characteristic amounts of the defects.

14. The apparatus for reviewing the defect according to claim 13, wherein the image processing means includes a non-defective state estimating section and a defect classifying section, and the non-defective state estimating section estimates the non-defective state which does not include any defect from the image of the area including the defect picked up at the second magnification which is larger than the first magnification by the image acquiring means to prepare the second magnification reference image.

15. The apparatus for reviewing the defect according to claim 14, wherein the non-defective state estimating section estimates the non-defective state which does not include any defect from the image of the area including the acquired first magnification defect to prepare the first magnification reference image.

16. The apparatus for reviewing the defect according to claim 14, wherein the non-defective state estimating section extracts information of a pitch of a pattern formed on the surface of the sample included in the acquired image of the area including the second magnification defect to prepare the second magnification reference image.

17. The apparatus for reviewing the defect according to claim 13, wherein the image acquiring means is a scanning electron microscope.

18. The method of claim 13, wherein the image is picked up by use of information of a defect detected beforehand by another inspection device.

19. An apparatus for reviewing a defect on a sample, comprising:
 image acquiring means for picking up an image of the sample to acquire an image of the surface of the sample;
 table means for disposing the sample and controlling a position of the sample so that a desired area picture of the sample enters an image pickup view field of the image acquiring means;
 image processing means for processing the image obtained by picking up, by the image acquiring means, an image of the desired area on the sample whose position is controlled by the table means; and
 control means for controlling the image acquiring means, the table means, and the image processing means;
 wherein the image processing means comprises:
 a non-defective state estimation calculating function section for estimating a non-defective state of a defective portion in which the defect exists by use of the image including the defect acquired by the image acquiring means to synthesize a reference image; and
 a defect classifying function section for comparing the reference image synthesized by the non-defective state estimation calculating function section with the image including the defect acquired by the image acquiring means to detect defects, and classifying the detected defects.

20. The apparatus for reviewing the defect according to claim 19, further comprising:
 means for storing or displaying a non-defective state estimation result of the defective portion calculated by the non-defective state estimation calculating function section.

21. The apparatus for reviewing the defect according to claim 19, wherein the defect classifying function section includes either or both of a first judging function section which judges a positional relation between the defect and a circuit pattern present in a background of the defect and a second judging function section which judges a non-flat state of the defective portion.

22. The apparatus for reviewing the defect according to claim 19, wherein the image acquiring means is a scanning electron microscope.

* * * * *

UNITED STATES PATENT AND TRADEMARK OFFICE
CERTIFICATE OF CORRECTION

PATENT NO. : 7,657,078 B2  Page 1 of 1
APPLICATION NO. : 11/311254
DATED : February 2, 2010
INVENTOR(S) : Nakagaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Thirtieth Day of November, 2010

David J. Kappos
*Director of the United States Patent and Trademark Office*